United States Patent
Goren et al.

(10) Patent No.: US 9,937,968 B2
(45) Date of Patent: Apr. 10, 2018

(54) STACKABLE VEHICLE

(71) Applicants: Michael Goren, Schenectady, NY (US); Jeremy E. Goren, Schenectady, NY (US)

(72) Inventors: Michael Goren, Schenectady, NY (US); Jeremy E. Goren, Schenectady, NY (US)

( * ) Notice: Subject to any disclaimer, the term of this patent is extended or adjusted under 35 U.S.C. 154(b) by 145 days.

(21) Appl. No.: 14/938,460

(22) Filed: Nov. 11, 2015

(65) Prior Publication Data
US 2017/0015370 A1 Jan. 19, 2017

Related U.S. Application Data

(60) Provisional application No. 62/191,835, filed on Jul. 13, 2015.

(51) Int. Cl.
| | |
|---|---|
| *B62D 39/00* | (2006.01) |
| *B62D 61/10* | (2006.01) |
| *B60S 9/21* | (2006.01) |
| *B62D 31/00* | (2006.01) |
| *B62D 61/12* | (2006.01) |

(52) U.S. Cl.
CPC ............ *B62D 39/00* (2013.01); *B60S 9/21* (2013.01); *B62D 31/003* (2013.01); *B62D 61/10* (2013.01); *B62D 61/12* (2013.01)

(58) Field of Classification Search
CPC .... B62D 39/00; B62D 31/003; B62D 31/006; B62D 61/12; B62D 61/10; B62D 61/125; B62D 33/02; B62D 33/00; B60S 9/21; B60S 9/00; B60S 9/14; B60S 9/02; B60S 9/06; B60S 9/08; B60S 9/10; B60S 9/12; B60S 9/205; B60S 9/215; B62B 5/02; B62B 3/00; B62B 3/02; B62B 3/06; B62B 3/0612; B62B 3/0625; B62B 3/0643; B62B 3/16
See application file for complete search history.

(56) References Cited

U.S. PATENT DOCUMENTS

| | | |
|---|---|---|
| 2,347,906 A | 5/1944 | Hatcher |
| 2,495,169 A | 1/1950 | Jennings |

(Continued)

OTHER PUBLICATIONS

ISR/WO, dated Nov. 15, 2016, PCT Application. PCT/US16/41708, 16 pages.

(Continued)

*Primary Examiner* — James M Dolak
(74) *Attorney, Agent, or Firm* — Cantor Colburn LLP (57) ABSTRACT

A stackable vehicle is provided and includes a deck, pairs of controllable support elements at each of a first pair of opposed minor surfaces of the deck and comprising a first leg affixed to the deck and transversely telescopic relative to a corresponding minor surface plane, a second leg coupled to a distal end of the first leg and telescopic in parallel with the corresponding minor surface plane and a pivotable and rotatable wheel disposed at a distal end of the second leg and pairs of controllable support elements at each of a second pair of opposed minor surfaces of the deck and comprising a first leg affixed to the deck, a second leg coupled to a distal end of the first leg and telescopic in parallel with a corresponding minor surface plane and a pivotable and rotatable wheel disposed at a distal end of the second leg.

16 Claims, 5 Drawing Sheets

(56) References Cited

U.S. PATENT DOCUMENTS

| | | | |
|---|---|---|---|
| 3,366,396 A * | 1/1968 | Hardy | E04F 21/22 280/32.5 |
| 3,438,641 A | 4/1969 | Bradley | |
| 3,554,309 A * | 1/1971 | Abercrombie | B62B 5/023 180/8.2 |
| 3,819,086 A | 6/1974 | Paolucci | |
| 3,933,218 A * | 1/1976 | Oler | B62D 7/08 180/411 |
| 4,050,571 A | 9/1977 | Kushigian | |
| 4,092,569 A | 5/1978 | Herr | |
| 4,298,128 A | 11/1981 | Gattu | |
| 4,337,868 A | 7/1982 | Gattu | |
| 4,396,126 A | 8/1983 | Moravec et al. | |
| 4,407,406 A | 10/1983 | Norris | |
| 4,540,142 A | 9/1985 | Veauz | |
| 4,551,059 A * | 11/1985 | Petoia | B66C 19/005 414/459 |
| 4,569,409 A | 2/1986 | Kluth | |
| 4,761,841 A | 8/1988 | Larsen | |
| 4,790,548 A | 12/1988 | Decelles et al. | |
| 4,960,290 A | 10/1990 | Bose | |
| 5,245,238 A | 9/1993 | Lynch | |
| 5,310,140 A | 5/1994 | Veaux | |
| 5,374,879 A | 12/1994 | Pin | |
| 5,558,174 A | 9/1996 | Avitan et al. | |
| 5,580,314 A | 12/1996 | Moriyama | |
| 5,653,301 A * | 8/1997 | Andre | A61G 5/061 180/8.2 |
| 5,676,215 A | 10/1997 | Misawa | |
| 5,701,965 A | 12/1997 | Kamen et al. | |
| 5,722,504 A * | 3/1998 | Gaetani | B60G 3/00 180/411 |
| 5,731,987 A | 3/1998 | Strong | |
| 5,772,233 A * | 6/1998 | Papendick | B05B 13/0285 269/17 |
| 5,833,248 A | 11/1998 | Eguchi | |
| 5,933,934 A | 8/1999 | Giannetti | |
| 6,193,612 B1 | 2/2001 | Craig | |
| 6,232,690 B1 | 5/2001 | Schmider | |
| 6,311,794 B1 | 11/2001 | Morrell et al. | |
| 6,328,125 B1 | 12/2001 | Van Den Brink et al. | |
| 6,341,784 B1 | 1/2002 | Carstens | |
| 6,343,556 B1 * | 2/2002 | Lanphear | A47B 9/10 108/147 |
| 6,368,225 B1 | 4/2002 | Breese | |
| 6,455,969 B1 | 9/2002 | Chen | |
| 6,484,829 B1 | 11/2002 | Cox | |
| 6,484,839 B2 | 11/2002 | Cole | |
| 6,491,234 B2 | 12/2002 | Beggs | |
| 6,527,644 B2 | 3/2003 | Glowacki | |
| 6,543,266 B1 | 4/2003 | Jaekel | |
| 6,547,340 B2 | 4/2003 | Harris | |
| 6,588,065 B1 | 7/2003 | Tucker, III | |
| 6,615,938 B2 | 9/2003 | Morrell et al. | |
| 6,695,084 B2 | 2/2004 | Wilk | |
| 6,722,458 B2 | 4/2004 | Hofbauer | |
| 6,863,288 B2 | 3/2005 | Van Den Brink | |
| 6,874,432 B2 * | 4/2005 | Lanphear | A47B 9/10 108/147 |
| 6,945,541 B2 | 9/2005 | Brown | |
| 7,032,859 B2 | 4/2006 | Mohr | |
| 7,066,041 B2 | 6/2006 | Nielsen | |
| 7,080,436 B2 | 7/2006 | Durand | |
| 7,111,700 B2 | 9/2006 | Czysz | |
| 7,207,890 B2 | 4/2007 | Lukac | |
| 7,246,671 B2 * | 7/2007 | Goren | A61G 5/061 180/209 |
| 7,246,672 B2 | 7/2007 | Shirai | |
| 7,316,282 B2 | 1/2008 | Mulhern et al. | |
| 7,445,178 B2 | 11/2008 | McCoskey et al. | |
| 7,562,885 B2 | 7/2009 | Marcacci | |
| 7,648,148 B1 | 1/2010 | Mercier | |
| 7,722,063 B2 | 5/2010 | Dieziger | |
| 7,806,644 B2 * | 10/2010 | Yuyama | B65G 65/00 414/331.06 |
| 7,812,490 B2 | 10/2010 | Pedrazzini | |
| 7,871,234 B2 * | 1/2011 | Yuyama | A61G 12/001 280/33.997 |
| 8,186,199 B2 | 5/2012 | Wagner | |
| 8,220,349 B2 | 7/2012 | Prichard | |
| 8,253,294 B1 | 8/2012 | Wishart | |
| 8,283,831 B1 | 10/2012 | Kaminsky | |
| 8,418,787 B2 * | 4/2013 | Bouhraoua | B62B 5/0033 180/24.02 |
| 8,499,867 B2 | 8/2013 | Marcacci | |
| 8,531,072 B2 | 9/2013 | Wishart | |
| 8,628,289 B1 * | 1/2014 | Benedict | B65G 1/0464 414/217 |
| 8,650,710 B1 | 2/2014 | Waggener | |
| 8,651,228 B2 | 2/2014 | Eick et al. | |
| 8,661,596 B2 | 3/2014 | Jungnickel | |
| 8,667,659 B2 | 3/2014 | Blacklin | |
| 8,668,163 B2 | 3/2014 | Colantonio et al. | |
| 8,668,475 B2 | 3/2014 | Gregory et al. | |
| 8,695,746 B2 | 4/2014 | Holroyd et al. | |
| 8,776,917 B2 * | 7/2014 | Bouhraoua | B62B 5/0033 180/24.02 |
| 8,781,684 B2 | 7/2014 | Bruce | |
| 8,833,780 B2 | 9/2014 | Cheng et al. | |
| 8,910,326 B2 | 12/2014 | Wilson | |
| 8,925,475 B2 | 1/2015 | Harbin | |
| 8,926,217 B1 | 1/2015 | Smith | |
| 8,979,102 B1 | 3/2015 | Prentice | |
| 8,987,962 B2 | 3/2015 | Kim | |
| 9,573,421 B2 * | 2/2017 | Tiilikainen | B60B 33/0005 |
| 9,661,923 B2 * | 5/2017 | Lanphear | A47B 83/04 |
| 9,789,799 B2 * | 10/2017 | Pawluk | B60P 1/433 |
| 9,796,568 B1 * | 10/2017 | Gonzales | B66F 5/04 |
| 9,808,545 B2 * | 11/2017 | Mauzerall | A61L 2/07 |
| 9,834,263 B1 * | 12/2017 | Nooren | B62D 49/0678 |
| 2003/0015359 A1 | 1/2003 | Hanscombe | |
| 2003/0127259 A1 | 7/2003 | Logstrup | |
| 2006/0151218 A1 | 7/2006 | Goren et al. | |
| 2010/0155168 A1 | 6/2010 | Mies | |
| 2011/0067513 A1 | 3/2011 | Wilson | |
| 2012/0028216 A1 | 2/2012 | Mossle | |
| 2012/0241237 A1 | 9/2012 | Holroyd et al. | |
| 2013/0038179 A1 | 2/2013 | Mirmobin | |
| 2013/0218436 A1 | 8/2013 | Kirby | |
| 2015/0075306 A1 | 3/2015 | Castelli | |

OTHER PUBLICATIONS

Depangher, Thesis—Design and Implementation of Eight-Legged Robotic Transporter, Sep. 2013; pp. i-19.

Depangher, Thesis—Design and Implementation of Eight-Legged Robotic Transporter, Sep. 2013; pp. 20-49.

Depangher, Thesis—Design and Implementation of Eight-Legged Robotic Transporter, Sep. 2013; pp. 50-73.

Depangher, Thesis—Design and Implementation of Eight-Legged Robotic Transporter, Sep. 2013; pp. 74-97.

Depangher, Thesis—Design and Implementation of Eight-Legged Robotic Transporter, Sep. 2013; pp. 98-118.

* cited by examiner

STACKABLE VEHICLE

BACKGROUND OF THE DISCLOSURE

The subject matter disclosed herein relates to a stackable vehicle and, more particularly, to a stackable vehicle, a stackable vehicle system and a vehicle stacking method.

Humans and cargo are transported by many types of vehicles and methods. In environments, such as streets of city centers and downtown areas of smaller cities and towns, and also parking lots of airports, apartment buildings, office structures, stadiums or supermarkets, or where commuters board trains, for example, typically the number of parking spaces is inadequate to meet the needs of drivers. This results in frustrating, time-consuming and sometimes futile searches for parking spaces.

BRIEF DESCRIPTION OF THE DISCLOSURE

According to one aspect of the disclosure, a stackable vehicle is provided and includes a deck, pairs of controllable support elements at each of a first pair of opposed minor surfaces of the deck and comprising a first leg affixed to the deck and transversely telescopic relative to a corresponding minor surface plane, a second leg coupled to a distal end of the first leg and telescopic in parallel with the corresponding minor surface plane and a pivotable and rotatable wheel disposed at a distal end of the second leg and pairs of controllable support elements at each of a second pair of opposed minor surfaces of the deck and comprising a first leg affixed to the deck, a second leg coupled to a distal end of the first leg and telescopic in parallel with a corresponding minor surface plane and a pivotable and rotatable wheel disposed at a distal end of the second leg.

According to another aspect of the disclosure, a stackable vehicle system including multiple stackable vehicles is provided. Each stackable vehicle includes a deck, pairs of support elements at each minor surface of the deck and comprising a first leg affixed to one of the major surfaces of the deck and transversely telescopic relative to a plane of the corresponding minor surface, a second leg coupled to a distal end of the first leg and telescopic in parallel with the plane of the corresponding minor surface and a wheel disposed at a distal end of the second leg to be pivotable and rotatable and a controller to control respective operations of the first and second legs and the wheel of each support element to drive each stackable vehicle from an unstacked condition to a stacked condition relative to the deck of another stackable vehicle.

According to another aspect of the disclosure, a vehicle stacking method is provided and includes positioning a vehicle proximate to an obstruction, raising a deck of the vehicle above an upper surface of the obstruction, transitioning first proximal supports of the vehicle from a ground onto the upper surface while keeping second proximal supports and first and second remote supports on the ground, transitioning the second proximal supports from the ground onto the upper surface while keeping the first proximal supports on the upper surface and the first and second remote supports on the ground, transitioning the first remote supports from the ground onto the upper surface while keeping the first and second proximal supports on the upper surface and the second remote supports on the ground and transitioning the second remote supports from the ground onto the upper surface while keeping the first and second proximal supports and the first remote supports on the upper surface.

According to another aspect of the disclosure, a method of remotely controlling a vehicle is provided and includes the vehicle stacking method described above.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a stackable vehicle, a vehicle stacking system and a vehicle stacking method are provided such that more than one vehicle can be parked in a parking space at a time and such that freight or passenger vehicles can be stacked to take up the least amount of volume as possible.

With reference to FIGS. 1, 2-4 and 5, a stackable vehicle system 1 is provided and may include one or more components described in U.S. application Ser. No. 14/847,969, entitled, "VEHICLE, VEHICLE DRIVE ASSEMBLY AND VEHICLE STEERING ASSEMBLY," which was filed on Sep. 8, 2015 and which is entirely incorporated herein by reference. The stackable vehicle system includes multiple stackable vehicles 2, 3 and 4 that are stackable onto each other and/or onto an obstruction 5 (which may be provided as a stackable vehicle itself). Thus, the multiple stackable vehicles 2, 3 and 4 can be stored or stowed in a single space defined in a floor area as opposed to multiple spaces. Each of the multiple stackable vehicles 2, 3 and 4 is generally configured in a similar fashion as will be described below and the following description will, therefore, only relate to stackable vehicle 2 for purposes of clarity and brevity.

Figure 2:
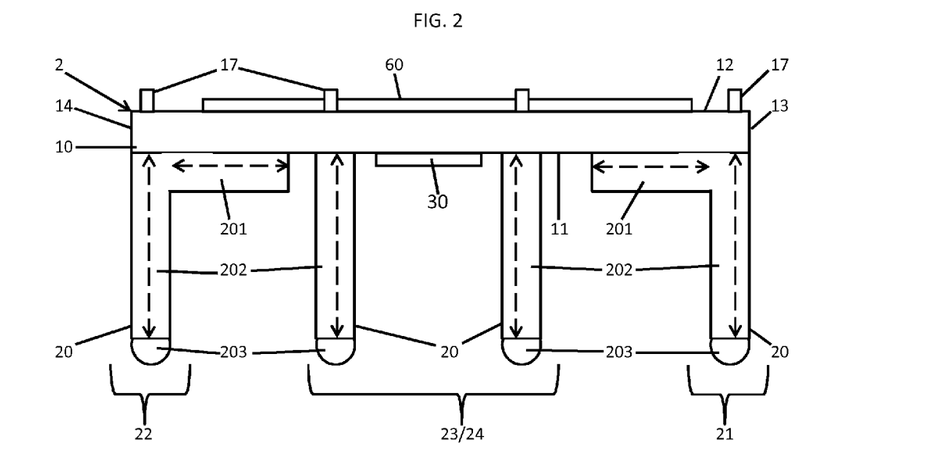
FIG. 2 is a left- or right-side view of a stackable vehicle of the stackable vehicle system of FIG. 1.
Figure 3:
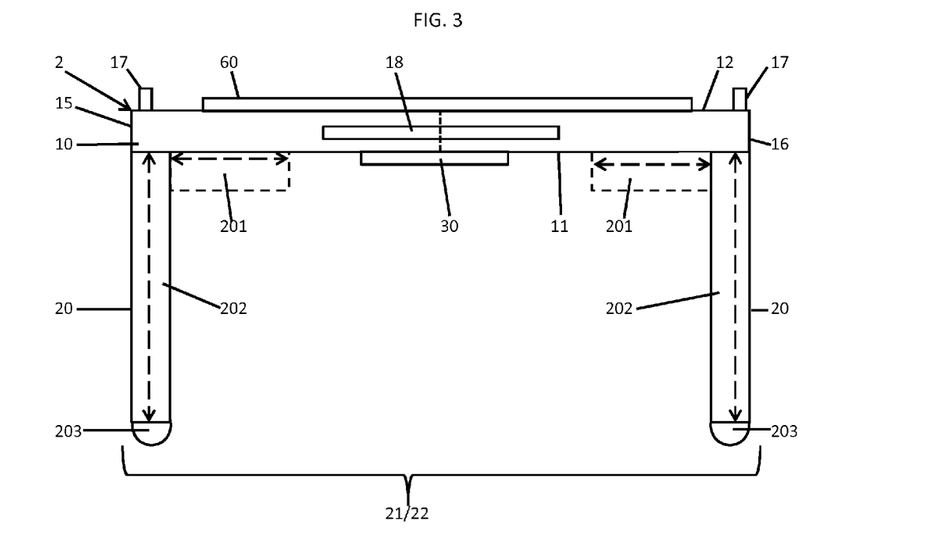
FIG. 3 is a front- or rear-end view of a stackable vehicle of the stackable vehicle system of FIG. 1.
Figure 4:
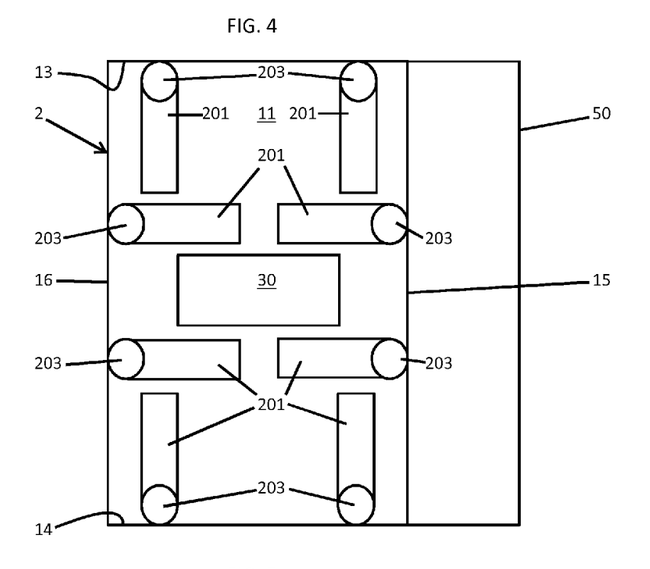
FIG. 4 is a bottom-up plan view of a stackable vehicle of the stackable vehicle system of FIG. 1.

As shown in FIGS. 2-4, the stackable vehicle 2 includes a deck 10, pairs of support elements 20 and a controller 30. The deck 10 may be generally planar and has a body with a first or lower major surface 11, a second or upper major surface 12, a forward minor surface 13, a rearward minor surface 14, a right-side minor surface 15 and a left-side minor surface 16. The deck 10 further include mounts 17 on the second major surface 12 for securing the wheels 203 (to be described below) of another one of the stackable vehicles 3 and 4. The mounts 17 may be provided as divots defined in the second major surface 12 or as wheel locks coupled to the second major surface 12. The deck 10 may also include extenders 18 (see FIG. 3) by which the deck is telescopically extendable or retractable in at least one direction (e.g., the forward/reverse direction and/or the right-sideward/left-sideward directions). Leaves may be installed between separated portions of the deck 10 during an extended condition.

The pairs of support elements 20 include a first pair 21 of support elements 20 at the forward minor surface 13, a second pair 22 of support elements 20 at the rearward minor surface 14, a third pair 23 of support elements 20 at the right-side minor surface 15 and a fourth pair 24 of support elements 20 at the left-side minor surface 16.

Figure 5:
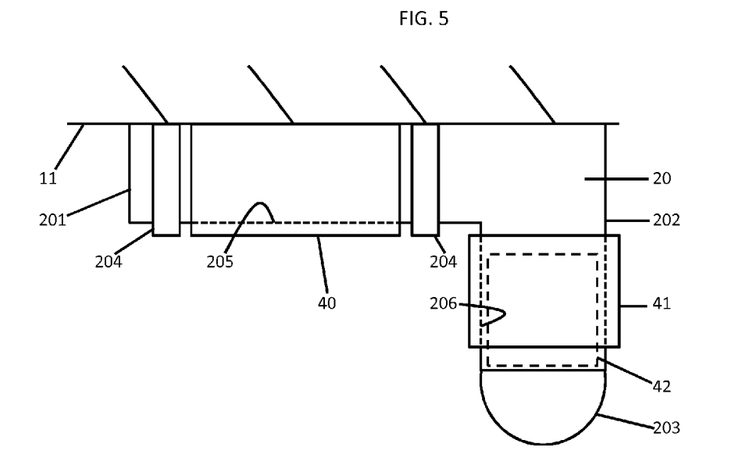
FIG. 5 is an enlarged view of a support element of a stackable vehicle in accordance with embodiments.

As shown in FIG. 5, each support element 20 includes a first telescoping leg 201, a second telescoping leg 202 and a wheel 203. The first telescoping leg 201 is affixed to the first major surface 11 by fastening elements 204 and has a telescopic portion 205 that allows the first telescoping leg 201 to telescopically extend and retract in a direction oriented transversely relative to a plane of the corresponding minor surface. The second telescoping leg 202 is coupled to a distal end of the first telescoping leg 201 and has a telescopic portion 206 that allows the second telescoping leg 202 to telescopically extend and retract in a direction oriented in parallel with the plane of the corresponding minor surface. The wheel 203 is disposed at a distal end of the second leg to be pivotable about a longitudinal axis of the second telescoping leg 202 and rotatable about a longitudinal wheel axis (or rotational axis).

The second telescoping leg 202 may be rotatably coupled to the distal end of the first telescoping leg 201. This rotatable coupling may be active or passive and, where the second legs 202 have different lengths owing to, say, some being extended and some being retracted, permits the deck 10 to be tilted downwardly toward the shorter second legs 202.

In accordance with embodiments, the first and second major surfaces 11 and 12 and the forward minor surface 13, the rearward minor surface 14, the right-side minor surface 15 and the left-side minor surface 16 are all perpendicular with adjacent surfaces. In accordance with further embodiments, the first legs 201 extend and retract perpendicularly with respect to the corresponding minor surfaces and the second legs 202 are perpendicular with respect to the first legs 201. The following description will relate to these embodiments, although it is to be understood that other configurations are possible and that these embodiments are merely exemplary.

The first legs 201 of the first pair 21 of support elements 20 are extendable and retractable forwardly and reversely relative to the forward minor surface 13 and the second legs 202 of the first pair 21 of support elements 20 are extendable and retractable downwardly and upwardly relative to the first major surface 11. One of the support elements 20 of the first pair 21 of support elements 20 is proximal to the right-side minor surface 15 and the other is proximal to the left-side minor surface 16. The first legs 201 of the second pair 22 of support elements 20 are extendable and retractable forwardly and reversely relative to the rearward minor surface 14 and the second legs 202 of the second pair 22 of support elements 20 are extendable and retractable downwardly and upwardly relative to the first major surface 11. One of the support elements 20 of the second pair 22 of support elements 20 is proximal to the right-side minor surface 15 and the other is proximal to the left-side minor surface 16. The first legs 201 of the third pair 23 of support elements 20 are extendable and retractable laterally outwardly or inwardly relative to the right-side minor surface 15 and the second legs 202 of the third pair 22 of support elements 20 are extendable and retractable downwardly and upwardly relative to the first major surface 11. One of the support elements 20 of the third pair 23 of support elements 20 is proximal to the forward minor surface 13 and the other is proximal to the rearward minor surface 14. The first legs 201 of the fourth pair 24 of support elements 20 are extendable and retractable laterally outwardly or inwardly relative to the left-side minor surface 16 and the second legs 202 of the fourth pair 22 of support elements 20 are extendable and retractable downwardly and upwardly relative to the first major surface 11. One of the support elements 20 of the fourth pair 24 of support elements 20 is proximal to the forward minor surface 13 and the other is proximal to the rearward minor surface 14.

The controller 30 may be provided as a locally or remotely controlled driving and steering element and is disposable in any portion (e.g., the center) of the stackable vehicle 2. In any case, the controller 30 is configured to control respective operations of the first telescoping leg 201, the second telescoping leg 202 and the wheel 203 of each support element 20 to thereby drive each of the multiple stackable vehicles 2, 3 and 4. In particular, the controller 30 may drive each of the multiple stackable vehicles 2, 3 and 4 from an unstacked condition to a stacked condition relative to the deck 10 of another stackable vehicle or to the upper surface 501 of the obstruction 5.

Figure 6:
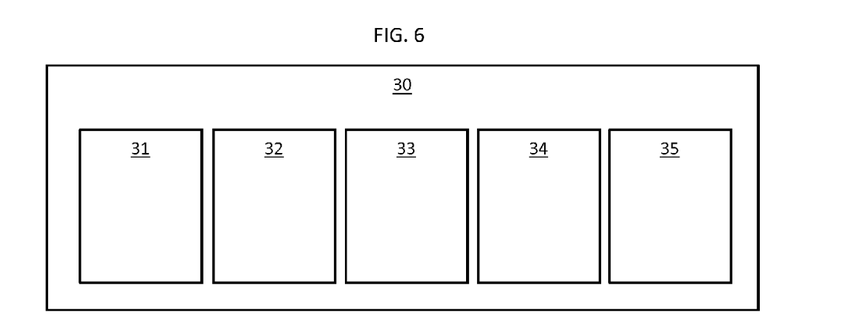
FIG. 6 is a schematic diagram illustrating components of a controller of a stackable vehicle in accordance with embodiments.

With reference to FIG. 6, the controller 30 may include a central processing unit 31, a memory unit 32, a power supply unit 33, a communications unit 34 and a servo control unit 35. The processing unit 31 may be any microprocessor or central processing unit (CPU) and performs the bulk of the processing control algorithms used to control the driving of the stackable vehicle 2. The memory unit 32 has executable instructions stored thereon, which, when executed, cause the processing unit 31 to execute the processing control algorithms. The power supply unit 33 may include an on-board rechargeable battery or another similar power storage element. The communications unit 34 permits wired or wireless communications between the stackable vehicle 2 and the other stackable vehicles 3 and 4 and between the stackable vehicle 2 and a local or remote operator. The servo control unit 35 is operable by the processing unit 31 to send servo control instructions for driving the stackable vehicle 2 to the first legs 201, the second legs 202 and the wheels 203 or each support element 20.

With reference back to FIG. 5, each support element 20 may include a first telescopic drive actuator 40, a second telescopic drive actuator 41 and a motor 42. The first telescopic drive actuator 40 is disposed in wired or wireless signal communication with the servo control unit 35 of the controller 30 and is coupled to the first telescoping leg 201 at the telescopic portion 205. The first telescopic drive actuator 40 may be provided as a linear or rotary actuator to drive the telescopic extension and retraction of the first telescoping leg 201 in accordance with commands received from the servo control unit 35. The second telescopic drive actuator 41 is disposed in wired or wireless signal communication with the servo control unit 35 of the controller 30 and is coupled to the second telescoping leg 202 at the telescopic portion 206. The second telescopic drive actuator 41 may be provided as a linear or rotary actuator to drive the telescopic extension and retraction of the second telescoping leg 202 in accordance with commands received from the servo control unit 35. The motor 42 is disposed in wired or wireless signal communication with the servo control unit 35 of the controller 30 and is coupled to the wheel 203. The motor 42 may be operable by commands received from the servo control unit 35 to pivot the wheel 203 about the longitudinal axis of the second telescoping leg 202 or to drive rotations of the wheel 203 about the rotational axis. In accordance with embodiments, at least the second telescopic drive actuator and the motor 42 may be incorporated into a single drive element as disclosed in U.S. application Ser. No. 14/847,969, entitled, "VEHICLE, VEHICLE DRIVE ASSEMBLY AND VEHICLE STEERING ASSEMBLY," which was filed on Sep. 8, 2015 and which is entirely incorporated herein by reference.

In accordance with further embodiments, the controller 30 is locally or remotely operable. In the latter case, the remote operation of the controller is facilitated by transmission and reception of signals by way of the communications unit 34. Alternatively or as an additional embodiment, the controller 30 may be provided with full or limited autonomous driving capability. To this end, the stackable vehicle 2 may further include autonomous driving assist elements including, but not limited to, LIDAR, radar, video cameras, sensors and associated processors and controllers.

Figure 1:
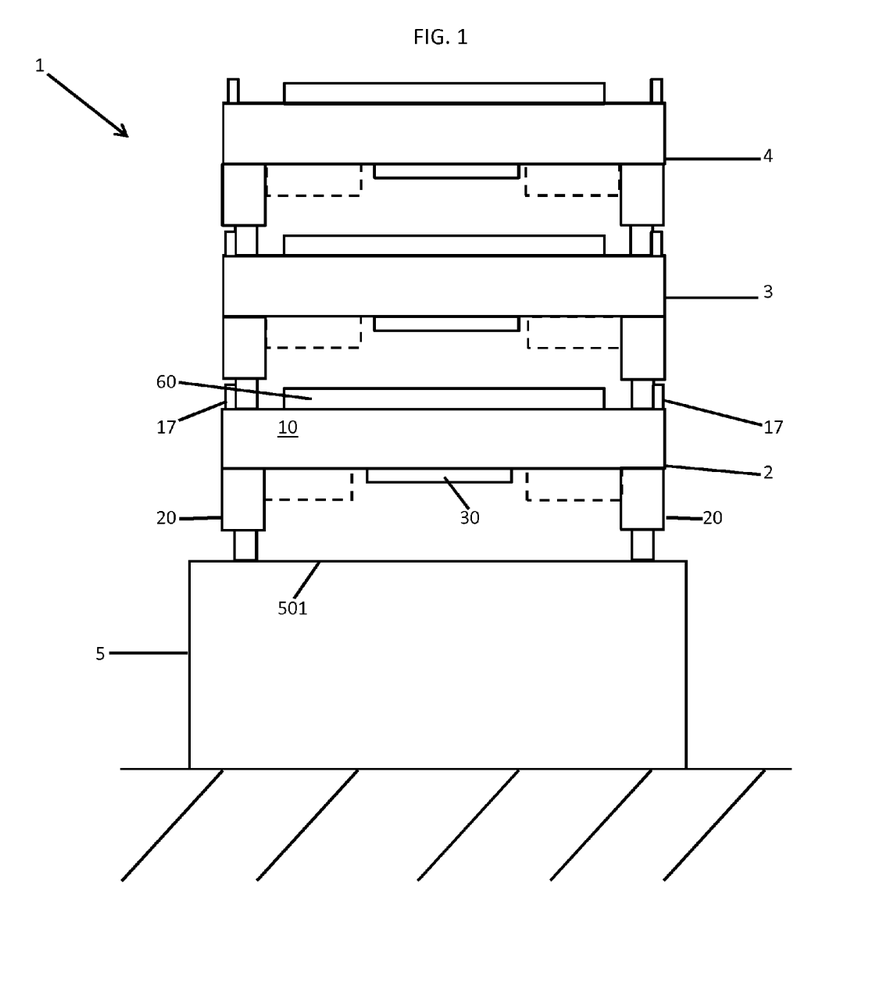
FIG. 1 is a front view of a stackable vehicle system in accordance with embodiments.

With reference back to FIG. 4 and to FIGS. 1 and 4 and, in accordance with further embodiments, the stackable vehicle 2 may include a ramp 50 and collapsible features 60. The ramp 50 can be pivotably attached to any one or more of the forward minor surface 13, the rearward minor surface 14, the right-side minor surface 15 and the left-side minor surface 16 and can be used to facilitate the stacking and dismounting of stackable vehicle 2 onto another one of the stackable vehicles 3 and 4. The collapsible features 60 may be disposed on the second major surface 12 and may include one or more of seating elements, steering elements, cabin features, structural posts, etc. The collapsible features 60 are collapsible to accommodate a second stackable vehicle 3 and 4 being mounted onto the stackable vehicle 2.

Figure 7:
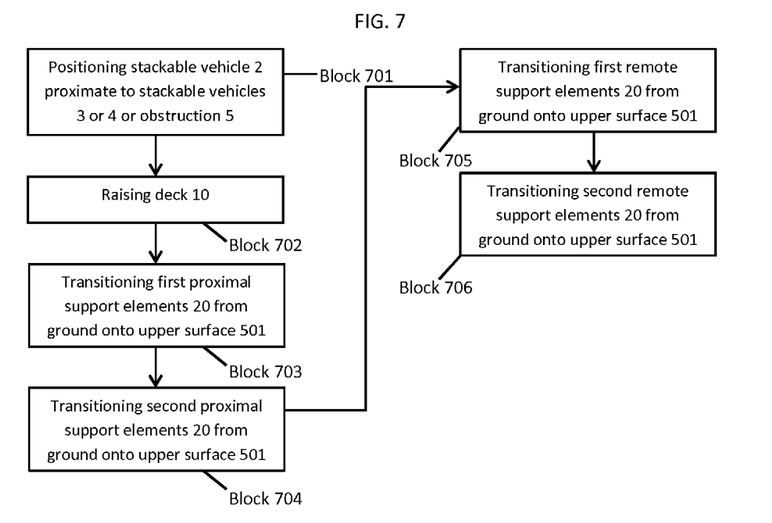
FIG. 7 is a flow diagram illustrating a method of stacking vehicles in accordance with embodiments.

With reference now to FIG. 7, a vehicle stacking method is provided. The vehicle stacking method includes positioning the stackable vehicle 2 proximate to one of the other stackable vehicles 3 or 4 or, in a more general case, the obstruction 5 at block 701 and raising the deck 10 above the upper surface 501 at block 702. The method further includes first-fourth transitioning operations at blocks 703-706. In each of the first-fourth transitioning operations at blocks 703-706, the second legs 202 of the transitioned support elements 20 are retracted upwardly toward the first major surface 11 and then extended downwardly toward the upper surface 501. The first legs 201 may also be extended and retracted (between the retraction and extension of the second legs 202) depending on the direction of the stacking as will be described below. The vehicle stacking method further includes a dismounting of the stackable vehicle 2 from, for example, the upper surface 501 of the obstruction 5 and, in some cases, a subsequent dismounting of another one of the stackable vehicles 3 or 4 from the deck 10 of the stackable vehicle 2.

In the first transitioning operation of block 703, the first proximal support elements 20 of the stackable vehicle 2 are transitioned from the ground onto the upper surface 501 while the second proximal support elements 20 and first and second remote support elements 20 are kept on the ground. In the second transitioning operation of block 704, the second proximal support element 20 are transitioned from the ground onto the upper surface 501 while keeping the first proximal support elements 20 on the upper surface 501 and the first and second remote support elements 20 on the ground. In the transitioning operation of block 705, the first remote support elements 20 are transitioned from the ground onto the upper surface 501 while keeping the first and second proximal support elements 20 on the upper surface 501 and the second remote support elements 20 on the ground. In the transitioning operation of block 706, the second remote support elements 20 are transitioned from the ground onto the upper surface 501 while keeping the first and second proximal support elements 20 and the first remote support elements 20 on the upper surface 501.

In accordance with embodiments, an execution of the vehicle stacking method of FIG. 7 will be described below with reference to FIG. 8.

Figure 8:
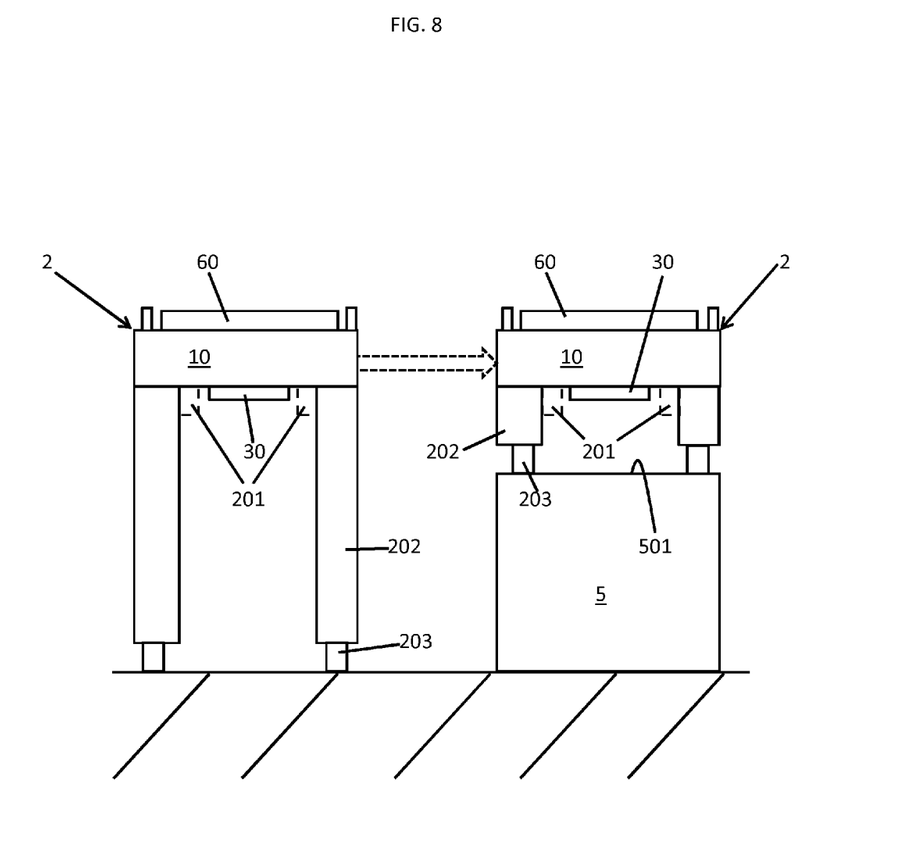
FIG. 8 is a schematic illustration of a stackable vehicle being stacked onto an obstruction.

Initially, as shown in the left-side portion of FIG. 8, the stackable vehicle 2 approaches the obstruction 5 by a driving (i.e., pivoting and rotating) of the wheels 203 of each of the support elements 20 such that the left-side minor surface 16 is adjacent to the upper surface 501. Next, the second legs 202 are extended to raise the deck 10 above the upper surface 501. At this point, the second legs 202 of the fourth pair 24 of support elements 20 are retracted toward the first major surface 11. Once the corresponding wheels 203 clear the upper surface 501, the first legs 201 of the fourth pair 24 of support elements 20 are extended laterally outwardly relative to the left-side minor surface 16 so that the corresponding wheels 203 are positioned over the upper surface 501. At this point, the second legs 202 are extended downwardly until the wheels 203 supportively contact the upper surface 501.

Subsequently, the stackable vehicle 2 is driven leftward (rightward in the illustration of FIG. 8) such that the ones of the first and second pairs 21 and 22 of support elements 20 that are proximate to the left-side minor surface 16 are adjacent to the obstruction 5. At this point, the second legs 202 of these support elements 20 are retracted toward the first major surface 11 such that the corresponding wheels 203 clear the upper surface 501. Then, the stackable vehicle 2 is again driven leftward such that the corresponding wheels 203 are placed over the upper surface 501. The second legs 202 are then extended such that the wheels 203 supportively contact the upper surface 501 and the stackable vehicle 2 is again driven leftward such that the ones of the first and second pairs 21 and 22 of support elements 20 proximate to the right-side minor surface 16 are adjacent to the obstruction 5. During this latter driving of the stackable vehicle 2, the first legs 201 of the fourth pair 24 of support elements 20 may be retracted laterally inwardly relative to the left-side minor surface 16 so that they remain on the upper surface 501.

Once the ones of the first and second pairs 21 and 22 of support elements 20 that are proximate to the right-side minor surface 15 are adjacent to the obstruction 5, the leftward driving of the stackable vehicle stops and the first legs 201 of the third pair 23 of support elements 20 are extended laterally outwardly relative to the right-side minor surface 15. The second legs 202 of the ones of the first and second pairs 21 and 22 of support elements 20 proximate to the right-side minor surface 15 are then retracted toward the first major surface 11 to clear the upper surface 501. Then, once the corresponding wheels 203 clear the upper surface 501, the leftward driving of the stackable vehicle 2 resumes such that the wheels 203 of the ones of the first and second pairs 21 and 22 of support elements 20 proximate to the right-side minor surface 15 are placed over the upper surface 501. At this point, the second legs 202 are extended such that the wheels 203 supportively contact the upper surface 501.

As a final stage, the second legs 202 of the third pair 23 of support elements 20 are retracted toward the first major surface 11 to clear the upper surface 501 and the stackable vehicle 2 is driven leftward such that the wheels 203 of the third pair 23 of support elements 20 are positioned over the upper surface 501. At this point, the second legs 202 are extended such that the wheels 203 supportively contact the upper surface 501 as shown in the right-side portion of FIG. 8. The mounts 17 can then be engaged to secure the wheels 203 in place and the collapsible features 60 may be collapsed to make room on the deck 10 for stackable vehicles 3 and 4 to be stacked onto the stackable vehicle 2 (alternatively, stackable vehicles 3 and 4 may already be stacked onto stackable vehicle 2, in which case the collapsible features 60 will have already been collapsed).

Although FIG. 8 refers to a mounting process directed laterally, it is to be understood that a similar process may be used for a forward/reverse mounting or for a diagonal mounting of the stackable vehicle. The only differences being that, in the forward/reverse mounting processes, the forward/reverse extension of the first legs 201 may be discarded or skipped and, in the diagonal mounting processes, support elements 20 are singularly operable (as opposed to being cooperatively operable). In any case, dismounting processes for dismounting the stackable vehicle 2 are similar to the stacking processes described above and need not be described in detail as the processes should be evident to one skilled in the art. Similarly, where stackable vehicles 3 and 4 are stacked onto stackable vehicle 2, the dismounting processes for these stackable vehicles 3 and 4 also do not need to be described in detail as the processes should be evident to one skilled in the art.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A stackable vehicle, comprising:
a deck comprising upper and lower surfaces, front and back surfaces and left-side and right-side surfaces;
first and second pairs of controllable support elements at the front and back surfaces, respectively, each of the first and second pairs of controllable support elements comprising a first leg affixed to the deck, which is perpendicularly telescopic relative to the front and back surfaces, a second leg coupled to a distal end of the first leg, which is telescopic in parallel with the front and back surfaces, and a pivotable and rotatable wheel disposed at a distal end of the second leg; and
third and fourth pairs of controllable support elements at the left-side and right-side surfaces, respectively, each of the third and fourth pairs of controllable support elements comprising a first leg affixed to the deck, which is perpendicularly telescopic relative to the left-side and right-side surfaces, a second leg coupled to a distal end of the first leg, which is telescopic in parallel with the left-side and right-side surfaces, and a pivotable and rotatable wheel disposed at a distal end of the second leg.

2. The stackable vehicle according to claim 1, wherein the deck comprises mounts on the upper surface for securing wheels of another stackable vehicle.

3. The stackable vehicle according to claim 1, wherein:
the first and second legs of each controllable support element are perpendicular relative to one another, and
the wheel of each controllable support element is pivotable relative to a longitudinal axis of the corresponding second leg and rotatable about a longitudinal axis thereof.

4. The stackable vehicle according to claim 1, further comprising:
telescopic drive actuators coupled to each of the first and second legs; and
motors coupled to the wheel to drive rotations thereof.

5. The stackable vehicle according to claim 1, further comprising a remotely operable controller.

6. The stackable vehicle according to claim 1, further comprising an autonomous controller.

7. A stackable vehicle system comprising:
multiple stackable vehicles according to claim 1, and
a controller to control respective operations of the first and second legs and the wheel of each controllable support element to drive each stackable vehicle from an unstacked condition to a stacked condition relative to the deck of another stackable vehicle.

8. The stackable vehicle system according to claim 7, wherein the upper surfaces of the deck comprises mounts for securing wheels of another stackable vehicle.

9. The stackable vehicle system according to claim 7, further comprising:
telescopic drive actuators coupled to each of the first and second legs of each support element; and
motors coupled to the wheel of each support element to drive rotations thereof.

10. The stackable vehicle system according to claim 7, wherein the controller is remotely operable.

11. The stackable vehicle system according to claim 7, wherein the controller has autonomous driving capability.

12. The stackable vehicle system according to claim 7, wherein each stackable vehicle comprises a ramp.

13. The stackable vehicle system according to claim 7, wherein the deck is telescopic in at least one direction.

14. The stackable vehicle system according to claim 7, wherein the multiple stackable vehicles are communicative with each other.

15. The stackable vehicle system according to claim 7, further comprising collapsible features disposable on the deck.

16. A stackable vehicle, comprising:
a deck comprising front, back, left-side and right-side surfaces;
first and second support elements at each of the front and back surfaces, respectively, each of the first and second support elements comprising a first leg affixed to the deck, which is telescopic in a front-back direction, a second leg coupled to an end of the first leg, which is telescopic in an up-down direction, and a pivotable and rotatable wheel disposed at an end of the second leg; and
third and fourth support elements at each of the left-side and right-side surfaces, respectively, each of the third and fourth support elements comprising a first leg affixed to the deck, which is telescopic in a left-right direction, a second leg coupled to an end of the first leg, which is telescopic in the up-down direction, and a pivotable and rotatable wheel disposed at an end of the second leg.

\* \* \* \* \*